July 14, 1959 — L. C. CONNER — 2,894,565

CONTOURING BACK REST FOR MOTOR VEHICLE SEATS

Filed May 17, 1957 — 2 Sheets-Sheet 1

INVENTOR.
LYMAN CLARK CONNER
BY Lynn H. Latta
ATTORNEY

July 14, 1959  L. C. CONNER  2,894,565
CONTOURING BACK REST FOR MOTOR VEHICLE SEATS
Filed May 17, 1957  2 Sheets-Sheet 2
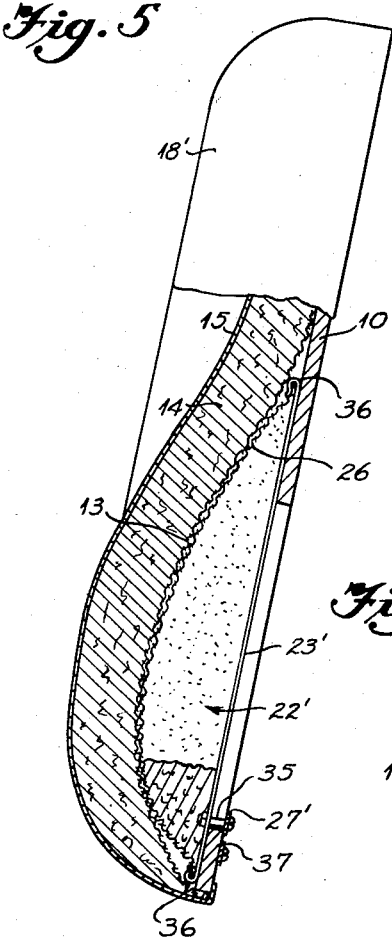
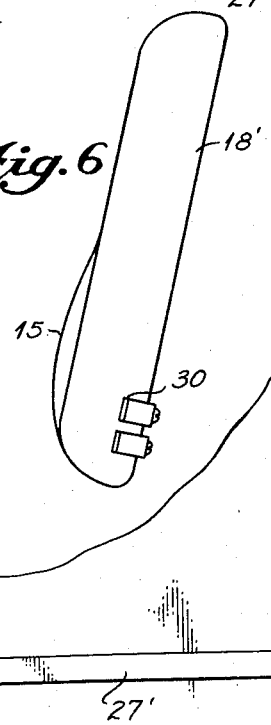
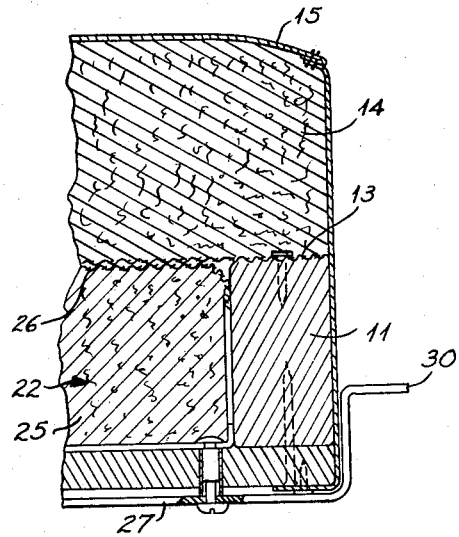
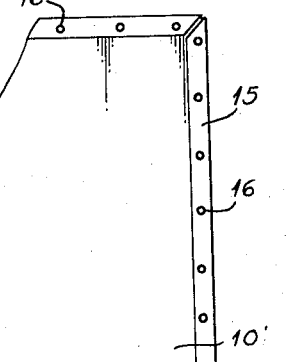
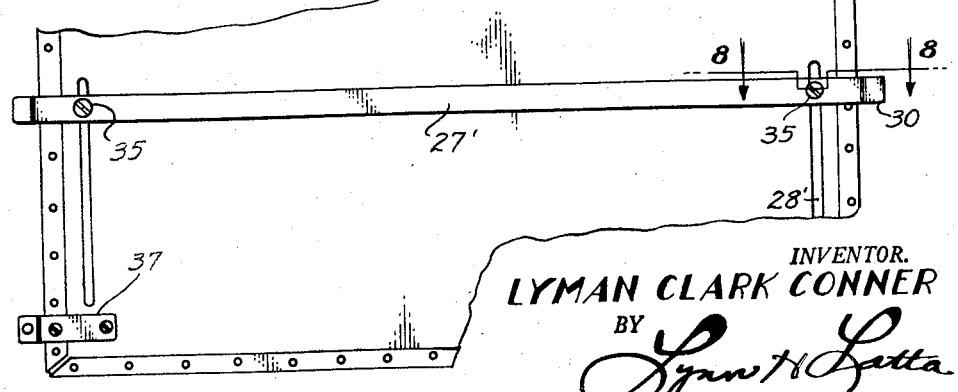
INVENTOR.
LYMAN CLARK CONNER
BY
*Lynn H. Letta*
ATTORNEY United States Patent Office 2,894,565
Patented July 14, 1959

2,894,565

CONTOURING BACK REST FOR MOTOR VEHICLE SEATS

Lyman Clark Conner, Los Angeles, Calif., assignor of one-half to Hubert R. Crane, Los Angeles, Calif.

Application May 17, 1957, Serial No. 659,933

10 Claims. (Cl. 155—158)

This invention relates to back rests for vehicle seats. Its general object is to provide a back rest having means for adjustably contouring the same to afford greater rest and comfort for the back of a vehicle driver than can be derived from the conventional back rest.

A further object is to provide a back rest having adjustable contouring means adapted to provide in one position a contour for supporting a driver's back in a manner to provide maximum stimulation of alertness and, in another position, to provide maximum relaxation.

While the invention is adapted for use in any motor vehicle it is especially useful in the operator's seats of trucks used in long distance freight hauling where a pair of drivers may alternate driving shifts and non-stop runs, one driver driving while the other rests. With individual back rests for the respective seats, each equipped with the contouring apparatus of this invention, the two operators may adjust their respective back rests to meet their respective requirements.

A further object is to provide an improved back rest having means providing for adjustable vertical contour, such that it may be adapted to best fit the backs of various persons, tall and short, with straight backs and with rounded backs, etc.

A further object is to provide a back rest having means providing a double curvature contour, with concave transverse contour in a portion of the height thereof and with convex vertical contour that is adjustable to fit the spinal curvature of various individuals.

Other objects will become apparent in the ensuing specification and appended drawings in which:

Fig. 5 is a side view, partially in vertical section, of a modified form of the invention;

Fig. 6 is a side view of the same;

Fig. 7 is a fragmentary rear elevation thereof; and

Fig. 8 is a detail sectional view on line 8—8 of Fig. 7.

Figure 1:
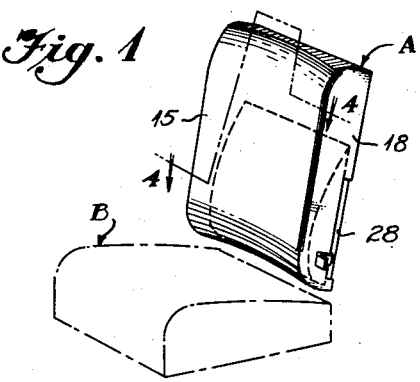
Fig. 1 is a perspective view of a motor vehicle seat provided with the back rest of my invention, the seat itself being shown in phantom.

Referring now to the drawing in detail, I have shown therein, as an example of one form in which the invention may be embodied, a back rest indicated generally at A, for a vehicle seat which is indicated in phantom at B. The invention contemplates any of the well known mechanisms for mounting the back rest A for hinging movement at its lower margin, where it joins the seat B, so that it may be tilted forwardly and backwardly to any selected position of inclination. However, since a conventional hinged mounting is contemplated and it forms no part of the present invention, such mechanism has not been illustrated herein.

Figure 4:
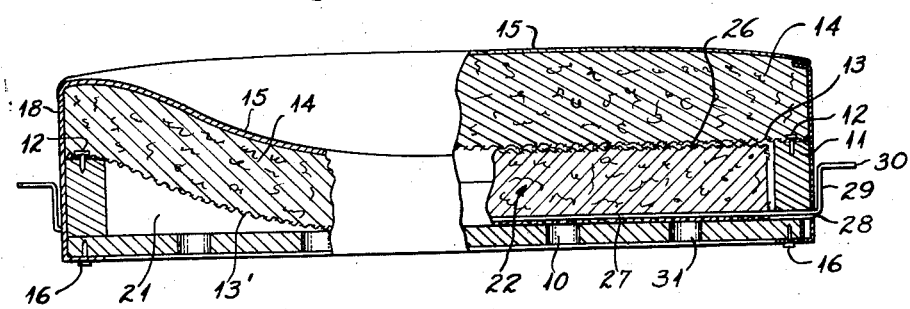
Fig. 4 is a top plan view of the back rest with a portion thereof shown in horizontal cross section.

Back rest A includes a rigid back panel 10 which may be a sheet of plywood or solid lumber or composition board or may be a stamped sheet metal panel, suitably reinforced in any conventional manner. Secured rigidly to the forward face of panel 10, extending vertically along the respective side margins thereof, and projecting forwardly, are a pair of rails 11 which are preferably of wood as indicated, or any equivalent nailable material. Secured to the forward faces of rails 11, as by means of upholstery tacks 12, is a web 13 of thin, flexible, tough, relatively unstretchable sheet material which supports the rear face of a cushion 14. Cushion 14 covers the entire forward face of panel 10 and overlaps the forward faces of rails 11, its side margins being flush with the outer sides of the rails as shown in Fig. 4. Cushion 14 is contained by a cover 15 of thin flexible sheet material, durable, tough, substantially non-stretchable and substantially air impervious, such as the imitation leather composition materials which are now commonly used in upholstering. The upper and lower extremities of cover 15 are stretched around the respective upper and lower margins of cushion 14, are lapped against the rear face of panel 10, and are secured, as by tacks 16 under vertical tension which causes the upper and lower corners of cushion 14 to be suitably rounded and assists in attaining the concave transverse contouring hereinafter more specifically referred to. Cover 15 has side flaps 18 which are suitably secured to the outer sides of rails 11 and may also be lapped behind the panel 10 and secured by tacks 16. Web 13 also has its upper and lower margins secured, as by means of tacks 20, to the upper and lower margins of panel 10 and is stretched under vertical tension (although relatively slack transversely) whereby its upper and lower margins are drawn downwardly into the space 21, between rails 11 to define a concave transverse curvature for cushion 14 as indicated at 13' in Fig. 4.

Web 13 is free of any attachment to the forward face of panel 10 throughout the entire area thereof, there being defined between the panel 10 and web 13 and between the rails 11, the space 21 in which is received a contouring member 22. In the form shown in Fig. 2, contouring member 22 is in the form of a supplementary cushion, including a rigid back plate 23 which may be of sheet metal or hard plastic sheeting, with flanges 24 bent forwardly at its respective side margins, a core 25 of cushioning material being seated against back plate 23 and secured thereto and contained by a retainer sheet 26 of tough flexible sheet material (e.g. woven fabric such as buckram) secured to the margins of back plate 23, or completely enclosing the same. Cushioning member 22 is of a convexly curved wedge shape, in vertical contour with a relatively thin upper portion tapering substantially to an edge, and a relatively thick lower portion which is arched forwardly in vertical section as shown, its maximum thickness being at approximately one third the height from the bottom. Contouring member 22 has a height less than that of the cushion 14, being approximately two thirds of the cushion height in the particular embodiment shown herein, although it will be understood that some variations in height, either way, could be utilized.

Attached to the forward face of back plate 23 is an actuator bar 27 which extends the full width of the back rest and has end portions projecting through slots 28 in the respective sides of the back rest. The projecting end portions of the bar 27 have forwardly projecting arms 29 terminating in outwardly extending handles 30 which may be grasped in the respective hands of an operator to manipulate the contouring member 22 upwardly and downwardly in the space 21.

Slots 28 are defined between the forward face of panel 10 and shallow elongated notches that are provided in the rails 11 for approximately half the height thereof from the bottom. The side flaps 18 of the cover 15 are correspondingly cut away to provide elongated openings in the flaps 18, registering with the slots 28.

The contouring member 22 is preferably of uniform thickness throughout its width, at any horizontal section thereof, but has its forward face convexly curved in vertical section and its rear face flat to conform to the flat forward face of panel 10.

Figure 2:
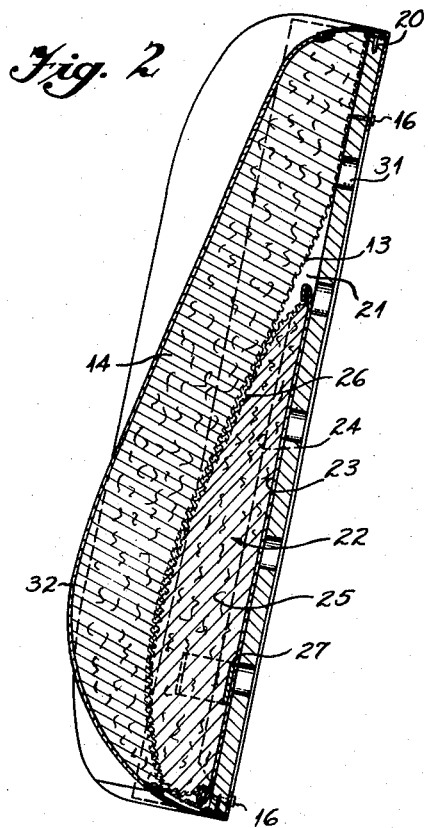
Fig. 2 is a vertical sectional view of the back rest with the contouring member thereof shown in its lower limit of vertical adjustment.

The cushion 14 (and the core 25 of contouring member 22) is of a soft, resilient, cellular material such as sponge rubber, with many small air cells from which the air can be discharged when the cushion is compressed. The cover 15, as previously stated, is of relatively impervious material whereas the web 13 is of relatively pervious material such as hard woven fabric webbing (e.g. canvas duck) allowing restricted passage of air therethrough. A number of vent openings 31 are provided in the panel 10, in the upper portion thereof, the number and size of openings being selected to provide for restricted escape of air from the chamber 21 when the cushion is compressed. The upward adjustment of contouring member 22, acting as a valve, progressively closes off the openings 31 so as to increase the resistance to the escape of air. This controlled escape of air provides a pneumatic cushioning action, supplementing the cushioning derived from the resiliency of cushion 14 and contouring member 22, and the pneumatic cushioning is regulated by the adjustment of the contouring member 22 so that, in the lowermost position of the latter as shown in Fig. 2, there will be maximum softness of cushioning action whereas in the uppermost position of adjustment shown in Fig. 3, there will be maximum stiffness of cushioning action.

The thicker portion of contouring member 22 displaces the cushion 14 formerly in a limited area thereof which produces a bulge 32. In the position of Fig. 2, the bulge 32 is near the bottom of the back rest and provides maximum support for the small of the back for a normal person. The vertical contour shown in Fig. 2 substantially conforms to the vertical curvature of the back of a normal person. In this adjustment, the back rest will provide maximum comfort and rest.

Figure 3:
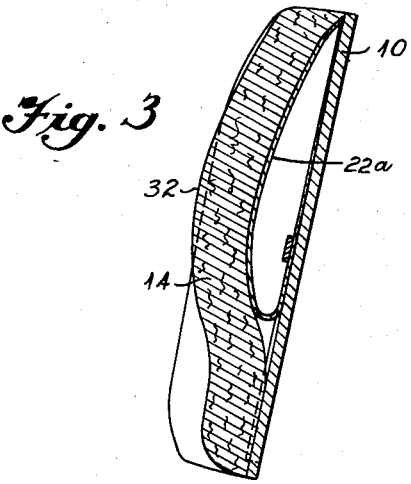
Fig. 3 is a vertical sectional view of a back rest embodying a modified form of the invention, with the contouring member shown in its upper position of vertical adjustment.

With the contouring member adjusted to its maximum height as shown in Fig. 3, the bulge 32 is displaced upwardly to approximately midway between the top and bottom of the back rest. This adjustment may be made to provide greater cushioning action for the shoulders of a driver, easing the strain on the shoulders when actuating the steering wheel of a motor vehicle.

The contouring member 22 may be adjusted vertically to accommodate the difference between the back curvature of a tall person and that of a short person.

In the position of Fig. 2, the vertical tension in web 13 and cover 15, combined with the weight of the operator's back leaning against the back rest, provides the transverse concave "bucket" contouring in the upper portion of the back rest which will accommodate a rounded shoulder contour of a sleeping person and provide some lateral support against side sway. Thus the position of Fig. 2 may be utilized for maximum comfort for resting or sleeping, whereas the position of Fig. 3, supporting the shoulders more squarely, may be utilized for driving operations.

The vertical tension in webbing 13 causes it to press the contoured member 22 against the back panel 10 sufficiently to effect a frictional grip thereon to support it in any selected position of adjustment. At the same time, the webbing 13 provides a hard, smooth surface against which the casing 26 of contouring member 22 may slide with ease to avoid jamming when the contouring member is being adjusted vertically. Transversely, the web 13 has just enough slack to allow it to sag to the concave contouring shown at 13'.

As shown in Fig. 3, the contouring member 22a may be in the form of a flattened ring of sheet metal, preferably resilient so as to have an inherent cushioning function, although it can be a relatively rigid shell.

In the form of the invention shown in Figs. 5, 6, 7 and 8, the construction, as referred to by reference numerals of Figs. 1–4 inclusive, is the same as that shown in those figures. It differs in the following respects:

The lateral slots 28 of Fig. 4 are eliminated and the actuator bar 27' is disposed adjacent the rear face of the back panel 10', the latter being provided with vertical slots 28'. A pair of studs 35 are secured in the actuator bar 27', extend through the slots 28' and are secured at their inner ends to the back plate 23' of contouring cushion 22'. The upper and lower ends of facing sheet 26 are bound in horizontal channels 36 formed integrally on the upper and lower ends of metal back plate 23'. Channels 36 are crimped tightly against the ends of the sheet 26 to secure the same under tension. The side flaps 18' of cover 15 are continuous and imperforate along the full height of the seat back. Fittings 37 are attached to the lower corners of back panel 10', for connection to suitable mechanism for effecting forward and rear adjustment of the lower end of the seat back, and suitable hinge fittings (not shown) may be utilized at the upper end of the back panel 10' for hingedly connecting the back to a fixed support.

I claim:

1. In a vibration absorbing back rest for a vehicle seat, in combination: a stiff back panel; a flexible padded cushion covering the forward face of said panel; a web of thin smooth sheet material interposed between the rear face of said cushion and the forward face of said panel and marginally attached to the upper and lower extremities of said panel but free of attachment to the forward face of said panel; a contouring member of approximately half the height of said cushion, interposed between said web and said forward face of the panel and slidably adjustable vertically for effecting a forward bulge in the padded area of said cushion at a selected height above said seat; and handles attached to said contouring member and projecting laterally from respective sides of said cushion for manipulating said contouring member vertically; said cushion and back panel being arranged to yieldingly grip said contouring member between them and to support the contouring member in any selected position of vertical adjustment by a frictional engagement therewith.

2. In a vibration absorbing back rest for a vehicle seat, in combination: a stiff back panel; a flexible padded cushion covering the forward face of said panel; a web of thin smooth sheet material interposed between the rear face of said cushion and the forward face of said panel and marginally attached to the upper and lower extremities of the panel but free of attachment to said forward face of the panel; a contouring member of less than the full height of said cushion and more than half the height thereof, interposed between said web and said forward face of the panel and slidably adjustable vertically between limit positions in the upper of which its upper end is near the top of the back rest and in the lower of which its lower end is near the bottom of the back rest, for effecting a forward bulge in said cushion at a selected height above said seat; and means for transmitting vertical sliding movement to said contouring member; said web being under tension between said upper and lower extremities of the panel so as to yieldingly press against said contouring member and to frictionally grip the same against said panel for supporting it in any selected position of vertical adjustment.

3. In a vibration absorbing back rest for a vehicle seat, in combination: a back panel having a plurality of vent openings therein; a flexible padded cushion covering the forward face of said panel; a cover of substantially air impervious flexible sheet material covering the forward face and margins of said cushion and attached and substantially sealed to the margins of said panel to provide a pneumatic chamber vented through said vent openings for pneumatic cushioning through a breathing action; a contouring member of more than half the height of said cushion, interposed between the opposed inner faces of the cushion and the panel and slidably adjustable vertically for effecting a forward bulge in the padded area of said cushion at a selected height above said seat; and handle means for manipulating said contouring member; said vent openings being arranged so as to be blocked by said contouring member to a greater or less extent depending upon the height of adjustment thereof.

4. In a vibration absorbing back rest for a vehicle seat, in combination: a panel having a plurality of vents; a cushion covering the forward face of said back rest, the cushion being of resilient cellular material adapted to discharge air when compressed; a cover of substantially air impervious thin flexible sheet material covering the forward face of said cushion and the margins thereof and attached and substantially sealed to the margins of said panel to provide therewith a pneumatic cushioning chamber from which restricted discharge of air through said vent openings may take place when said cushion is compressed, thus providing a pneumatic cushioning supplementing the cushioning effect of said cushions; a web of hard woven fabric sheeting interposed between the rear face of said cushion and the forward face of said panel, said web being porous to provide restricted passage of air from said chaamber to said vent openings; a contouring member of cushioning material of less height than said cushion interposed between said web and said panel and slidably adjustable vertically for effecting a forward bulge in the padded area of said cushion at a selected height above said seat; said web providing a smooth hard surface against which said contouring member may slid and being attached to the upper and lower margins of said panel and extending over said contouring member under tension so as to yieldingly press said contouring member against said panel to frictionally grip said contouring member and support the same in any selected position of vertical adjustment thereof; and means for transmitting vertical adjusting movement to said contouring member; said vent openings being arranged to be blocked by said contouring member to greater or less extent depending upon the position of vertical adjustment of said contouring member, whereby to vary the restriction of escape of air through said vent openings.

5. In a back rest for a vehicle seat, in combination: a frame including a rigid back panel and rails extending forwardly from the respective side margins thereof and supported thereby in rigidly spaced relation; a cushion covering the forward face of said panel; a web of tough, substantially non-stretchable thin sheet material interposed between said cushion and said panel, said web having its side margins anchored to said rails and extending between them in a slack condition transversely so as to develop a concave transverse contour in said cushion when the back of a person leans back against the cushion; a contouring member interposed between said web and said panel and slidably adjustable vertically for effecting a forward bulge in said cushion at a selected height above said seat; the upper and lower margins of said web being anchored respectively to the upper and lower margins of said panel with the web under tension vertically so as to press said contouring member against said panel and to frictionally grip the contouring member to support it in any selected position of vertical adjustment.

6. A back rest as defined in claim 2, including a cover of thin flexible sheet material covering the forward face and the margins of said cushion and marginally attached to the four margins of said panel under tension which, with the vertical tension in said web, results in a transverse concave contouring of that portion of the cushion which extends beyond said contouring member.

7. A back rest as defined in claim 2, wherein said contouring member is normally of wedge shape, with a thin tapering section at its upper extremity and a relatively thick lower portion the forward face of which is arched forwardly, and having a relatively flat rear face fitted to the forward face of said panel, the height of said contouring member being approximately two thirds the height of the cushion, whereby said bulge may be shifted from an area near the bottom of the cushion to a maximum height approximately midway between the bottom and top of the cushion.

8. In a vibration absorbing back rest for a vehicle seat, in combination: a stiff back panel; a flexible padded cushion covering the forward face of said panel; a web of thin smooth sheet material interposed between the rear face of said cushion and the forward face of said panel and marginally attached to the upper and lower extremities of the panel but free of attachment to said forward face of the panel; a contouring member of less height than said cushion, interposed between said web and said forward face of the panel and slidably adjustable vertically for effecting a forward bulge the padded area of said cushion at a selected height above said seat, said contouring member comprising a flat back plate in sliding bearing engagement against said back panel, a core of compressible cushioning material supported against said back plate, and a retainer sheet of tough flexible, substantially non-stretchable material secured to the upper and lower ends of said back plate and stretched therebetween and over said cushioning core, said retainer sheet having sliding bearing engagement with the rear face of said web; and means for transmitting vertical sliding movement to said contouring member; said web being under tension between said upper and lower extremities of the panel so as to yieldingly press against said contouring member.

9. In a vibration absorbing back rest for a vehicle seat, in combination: a stiff back panel; a flexible padded compressible cushion marginally attached to the upper extremity of said panel, extending downwardly over the forward face thereof to the lower end thereof and attached to said lower end, the rear face of said cushion being in opposed, unattached relation to said forward face of the panel, a web of thin smooth tough sheet material interposed between said rear face and the forward face of said panel and attached to the upper and lower extremities of the panel but free of attachment to said forward face of the panel; a contouring member having a height intermediate the full height and half the height of said cushion, interposed between said web and said forward face of the panel and slidably adjustable vertically between limit positions in the upper one of which its upper end is near the top of the back rest and in the lower one of which its lower end is near the bottom of the back rest, for effecting a forward bulge in the padded area of said cushion at a selected height above said seat; said contouring member including a rigid flat back plate slidably bearing against the forward face of said back panel, a core of compressible cushioning material supported against said back plate, and a retainer sheet of tough flexible substantially non-stretchable material secured to the upper and lower ends of said back plate and stretched therebetween over said cushioning core, said retainer sheet having sliding bearing engagement against the rear face of said web; and means for transmitting vertical sliding movement to said contouring member, said last means comprising studs rigidly secured to said back plate in laterally spaced relation, said back panel having vertical slots in laterally spaced relation corresponding to that of said studs, through which said studs extend to the back side of said back panel, and an actuator bar projecting transversely adjacent said back side of the back panel, secured to the rear ends of said studs, having integral arms bent forwardly and extending alongside the respective sides of said back rest, and terminating in integral handles bent laterally and outwardly from the forward ends of said arms and adapted to be grasped by an occupant of the seat for transmitting vertical adjusting movement to said contouring member.

10. In a vibration absorbing back rest for a vehicle seat, in combination, a frame including a rigid back panel and a pair of side rails projecting forwardly therefrom along the respective side margins thereof; a flexible padded cushion extending from top to bottom of said back rest, a web of smooth tough flexible sheet material having upper and lower ends secured to the respective upper and lower ends of said back panel and having side margins secured to said rails, said web extending across and bearing against the forward faces of said rails and bridging therebetween in forwardly spaced relation to said back panel to define a slide cavity extending uninterruptedly from the top to the bottom of said back rest; said cushion including a body of soft compressible resilient material extending the full height and width of said frame across said cavity and over the forward faces of said rails and a cover sheet attached to said rails extending forwardly around the sides of said cushion body and thence over the forward face thereof, said cover sheet being attached to the top and bottom of said frame and stretched under vertical tension but relatively slack transversely so as to provide a forward concavity in the upper area of said cushion; a contouring member having a height intermediate the full height and half the height of said cushion, interposed between said web and said forward face of the panel and slidably adjustable vertically between limit positions in the upper one of which its upper end is near the top of the back rest and in the lower one of which its lower end is near the bottom of the back rest, for effecting a forward bulge in the padded area of said cushion at a selected height above said seat; said contouring member including a rigid flat back plate slidably bearing against the forward face of said back panel, a core of compressible cushioning material supported against said back plate, and a retainer sheet of tough flexible substantially non-stretchable material secured to the upper and lower ends of said back plate and stretched therebetween over said cushioning core, said retainer sheet having sliding bearing engagement against the rear face of said web; and means for transmitting vertical sliding movement to said contouring member, said last means comprising studs rigidly secured to said back plate in laterally spaced relation, said back panel having vertical slots in laterally spaced relation corresponding to that of said studs, through which said studs extend to the back side of said back panel, and an actuator bar projecting transversely adjacent said back side of the back panel, secured to the rear ends of said studs and projecting laterally beyond the side margins of said frame to provide a pair of handles adapted to be grasped by an occupant of the seat for transmitting vertical adjusting movement to said contouring member.

References Cited in the file of this patent
UNITED STATES PATENTS

| | | |
|---|---|---|
| 1,228,771 | Hanger | June 15, 1917 |
| 1,264,265 | Brusius | Apr. 30, 1918 |
| 1,420,990 | Friede | June 27, 1922 |
| 2,152,734 | Ford | Apr. 4, 1939 |
| 2,254,379 | Millar | Sept. 2, 1941 |
| 2,756,809 | Endresen | July 31, 1956 |

FOREIGN PATENTS

| | | |
|---|---|---|
| 762,304 | Great Britain | Nov. 28, 1956 |